US006585109B1

United States Patent
Beyer

(10) Patent No.: US 6,585,109 B1
(45) Date of Patent: Jul. 1, 2003

(54) RETURN DEVICE

(75) Inventor: Rolf Peter Beyer, Buchloe (DE)

(73) Assignee: WF Logistik GmbH, Landsberg (DE)

( * ) Notice: Subject to any disclaimer, the term of this patent is extended or adjusted under 35 U.S.C. 154(b) by 0 days.

(21) Appl. No.: 09/719,544

(22) PCT Filed: Jun. 18, 1999

(86) PCT No.: PCT/EP99/04245

§ 371 (c)(1),
(2), (4) Date: Dec. 18, 2000

(87) PCT Pub. No.: WO99/65802

PCT Pub. Date: Dec. 23, 1999

(30) Foreign Application Priority Data

Jun. 18, 1998 (DE) ..................... 298 10 942 U

(51) Int. Cl.$^7$ ........................... B65G 23/44; B65G 19/02
(52) U.S. Cl. ....................... 198/812; 198/814
(58) Field of Search ................. 198/814, 812, 198/678.1, 465.4

(56) References Cited

U.S. PATENT DOCUMENTS

| 992,568 A | * | 5/1911 | Loutensock | 198/814 |
| 2,355,100 A | * | 8/1944 | Nordquist | 198/814 |
| 3,647,050 A | | 3/1972 | Neal | |
| 4,270,906 A | * | 6/1981 | Kraft et al. | 198/813 |
| 4,339,031 A | * | 7/1982 | Densmore | 198/864 |
| 5,026,326 A | * | 6/1991 | Pollich et al. | 198/814 |
| 5,511,650 A | * | 4/1996 | Hurworth | 198/813 |
| 5,615,775 A | * | 4/1997 | Barbaret | 198/813 |

FOREIGN PATENT DOCUMENTS

| DE | 2121848 | 11/1972 |
| DE | 2432333 | 1/1975 |
| DE | 29 35 477 A1 | 3/1981 |
| DE | 3710722 A1 | 10/1988 |
| DE | 88 14 998.6 | 3/1989 |
| DE | 297 09 481 | 9/1998 |
| EP | 0 582 047 | 2/1994 |
| WO | WO 94/00372 | 1/1994 |

* cited by examiner

Primary Examiner—Douglas Hess
(74) Attorney, Agent, or Firm—Rothwell, Figg, Ernst & Manbeck

(57) ABSTRACT

The invention relates to a deflecting arrangement having a first deflecting element (34) for deflecting conveyable-article carriers (7), and having a second deflecting element (50) for deflecting an endless drive belt (9) for driving the conveyable-article carriers (7) in an overhead conveying arrangement, the deflecting arrangement (3') forming one of two deflecting stations around which the endless drive belt (9), which is driven for movement, runs as a loop, and the endless drive belt (9) being guided along the route region from deflecting station to deflecting station for carrying along conveyable-article carriers along the conveying route of the overhead conveying arrangement. For the purpose of adjusting the tensioning of the drive belt (9), the second deflecting element (50) is arranged on a mount (30) such that it can be displaced relative to the first deflecting element (34).

12 Claims, 4 Drawing Sheets

RETURN DEVICE

Figure 1A:
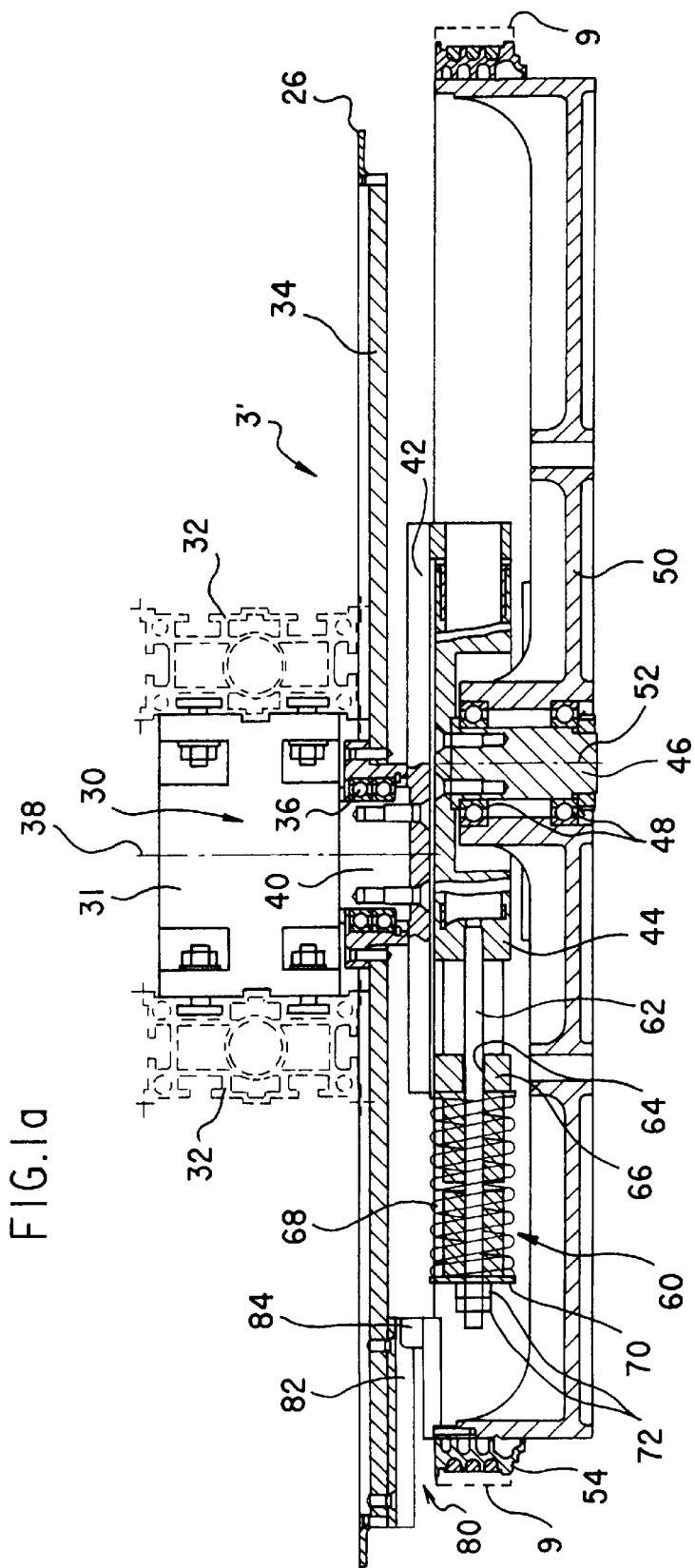

The invention relates to a deflecting arrangement having a first deflecting element for deflecting conveyable-article carriers, and having a second deflecting element for deflecting an endless drive belt for driving the conveyable-article carriers in a conveying arrangement, in particular overhead conveying arrangement, which comprises a running-rail guide for the conveyable-article carriers and is intended for transporting the conveyable-article carriers along a conveying route, the deflecting arrangement, in the installed state in the conveying arrangement, forming one of two spaced-apart deflecting stations around which the endless drive belt, which is driven for movement, runs as a loop, and the endless drive belt being guided along the route region from deflecting station to deflecting station for carrying along conveyable-article carriers along the conveying route.

A conveying arrangement having a deflecting arrangement of the generic type is known, for example, from EP 0 582 047 B1. This known conveying arrangement is an overhead conveying arrangement having at least one conveying loop comprising two end-side deflecting arrangements and running rails for straight-line travel along the respective conveying-route region from deflecting arrangement to deflecting arrangement. The conveyable-article carriers which are to be transported each have a carrier body which is essentially vertically aligned in the transporting position and has running rollers projecting from it on both sides and a bottom hook into which it is possible to fit the conveyable article which is to be transported. Upon movement of the respective conveyable-article carrier along a running rail, the conveyable-article carrier is supported in a laterally suspended manner on the running rail by way of one of its running rollers, the carrier being in drive connection, with a friction fit, with an endless friction belt by way of a protrusion beneath the running roller, said protrusion projecting from the carrier body in the direction of the running rail. The endless friction belt, which is designed as a flat steel belt, is guided on the running rail, by means of a guide, for movement along the conveying route and for carrying along relevant conveyable-article carriers with a friction fit. The deflecting arrangements according to EP 0 582 047 B1 are rotatable deflecting drums with vertically running axes of rotation. In the bottom region, each of the two deflecting drums, as an element for deflecting the friction belt, has a flat circumferential groove in which the endless friction belt is guided as it is deflected. Provided above the circumferential groove on each deflecting drum, as element for deflecting conveyable-article carriers, is a conveying flange which runs round the circumference. Said conveying flange serves for receiving conveyable-article carriers from a relevant running rail, during tangential advancement up to the deflecting drum, and for transporting the same upon deflection in accordance with rotation of the deflecting drum. For this purpose, the conveying flange engages in a lateral groove, which is bounded by two side webs and belongs to the relevant conveyable-article carrier, above the running roller supporting the conveyable-article carrier on the running rail, with the result that, finally, the top side web of the conveyable-article carrier rests on the top side of the conveying web and the conveyable-article carrier is thus supported on the conveying web in a laterally suspended manner for being carried along by the deflecting drum. It is possible to provide on the deflecting arrangement a transfer means which acts as a diverter and transfers the conveyable-article carriers from the deflecting drum onto a conveying route of another conveying loop. If such a transfer means is not present or has been rendered inactive, the conveyable-article carriers are deflected through 180° by the deflecting drum and then transferred to a running rail again, in order for them to be moved in the direction of the relevant other deflecting arrangement.

For driving the endless friction belt, one of the two deflecting drums is usually driven in rotation by a drive motor. For the endless friction belt to be carried along by the driven deflecting drum as far as possible without slippage, it is necessary for the endless friction belt to be tensioned. In order to ensure reliable functioning of the conveying arrangement, it should be ensured that the operations of the relevant conveyable-article carriers being received from a running rail onto the conveying flange of the deflecting drum, and of the conveyable-article carrier being deflected and subsequently transferred to the next running rail, take place at defined locations of the conveying route. For this purpose, in the conveying arrangements of the type described in EP 0 582 047 B1, the deflecting drums, in accordance with the desired conveying route, were installed at constant distances from one another and the endless friction belts readjusted with suitable tension during installation.

On account of changes in the length of the endless friction belt, for example as a result of temperature fluctuations, wear, etc., however, the problem of increased slippage between the friction belt and deflecting drum may arise, in particular with relatively large built-up pressure in the case of a conveying arrangement in which conveyable-article carriers may optionally be accumulated on a running rail.

The object of the present invention is to provide a deflecting arrangement of the type mentioned in the introduction which, in a relevant conveying arrangement, in particular overhead conveying arrangement, allows readjustment of the tensioning of the endless drive belt in the event of changing operational conditions, for example temperature fluctuations, without the mutual geometrical relationships of the elements forming the conveying route changing.

In order to achieve this object, the invention proposes that, for the purpose of adjusting the tensioning of the endless drive belt, the second deflecting element be arranged on a mount such that it can be displaced relative to the first deflecting element between a first position, namely a position of reduced distance from the other deflecting station, and a second position, namely a position of increased distance from the other deflecting station.

Unlike the prior-art deflecting arrangement which is known from EP 0 582 047 B1 and has the conveying flange as deflecting element for the conveyable-article carriers and the circumferential groove as deflecting element for the endless drive belt on a common deflecting drum, it is the case with the deflecting arrangement according to the invention that the deflecting element for the conveyable-article carriers and the deflecting element for the endless drive belt are no longer coupled rigidly in respect of all degrees of freedom. The deflecting element for the endless drive belt can be displaced relative to the deflecting element for the conveyable-article carriers and to the other deflecting station, in order for the tensioning of the endless drive belt to be adjusted. In this case, there is no change in the mutual geometrical relationships of the elements forming the conveying route, with the result that the transfer points for the conveyable-article carriers between running-rail guide and first deflecting element remain at their defined locations.

According to one embodiment, provision may be made for the second deflecting element to be arranged on the mount such that it can be fixed in its respective displacement position. In this case, the belt tensioning can be adjusted manually in each case by the second deflecting element being displaced into a displacement position suitable for the desired belt tensioning and then being fixed in said displacement position.

According to a preferred configuration, the deflecting arrangement, however, has a prestressing arrangement which subjects the second deflecting element to a force which resiliently prestresses the second deflecting element in the direction of the second position, in order to tension the endless drive belt. The second deflecting element, rather than being fixed rigidly in its displacement guide, is thus adjusted in a respective displacement position by the counteracting forces of the prestressing arrangement and of the endless drive belt, with the result that the endless drive belt always undergoes well-defined tensioning. In the case of an extension in length of the endless drive belt, the prestressing arrangement forces the second deflecting element in the direction of the second position, the tensioning of the endless drive belt being maintained in the process. In the case of a temperature-induced shortening of the endless drive belt, the second deflecting element can then yield in the direction of its first position, with the result that excessive belt tensioning is prevented. It is possible to provide, within the context of the invention, means for the variable adjustment of the prestressing force of the prestressing arrangement.

The first deflecting element and the second deflecting element are preferably rotatably mounted deflecting wheels with mutually parallel axes of rotation, the two deflecting wheels preferably being arranged on a common mount.

The second deflecting element or deflecting wheel, which is provided for deflecting the endless drive belt, is expediently mounted rotatably on a carriage which is guided in a carriage guide provided on the mount, in order to mount the second deflecting element displaceably relative to the first deflecting element.

The prestressing arrangement preferably has a prestressing spring for producing the prestressing force, the prestressing spring acting between the mount and the carriage in order to prestress the second deflecting element in the direction of the second position. The prestressing arrangement may be constructed in a straightforward manner using such a prestressing spring. Alternatively, it would also be possible to use a prestressing arrangement in which the prestressing force is produced, for example, by pneumatic means.

The endless drive belt is preferably a friction belt for carrying along the conveyable-article carriers with a friction fit, as is known, for example, from EP 0 582 047 B1.

In an alternative embodiment of the deflecting arrangement for a conveying arrangement with chain drive, the endless drive belt is a drive chain in which the conveyable-article carriers can engage with a form fit.

The two deflecting wheels are preferably coupled to one another for joint rotation by a coupling arrangement, the coupling arrangement having a radial guide on one of the deflecting wheels and a coupling element, which engages in the radial guide in a displaceable manner relative to the same, on the other deflecting wheel. The deflecting wheel for the conveyable-article carriers is, in this way, carried along for joint rotation during rotation of the deflecting wheel for the endless drive belt, it being possible, on account of the displaceability of the coupling element in the radial guide, for compensation to take place in respect of the eccentricity of the axes of the two deflecting wheels. The coupling arrangement thus also functions when the second deflecting wheel is not located coaxially with the first deflecting wheel because said second deflecting wheel has been displaced relative to the first deflecting wheel by the prestressing arrangement.

Figure 1B:
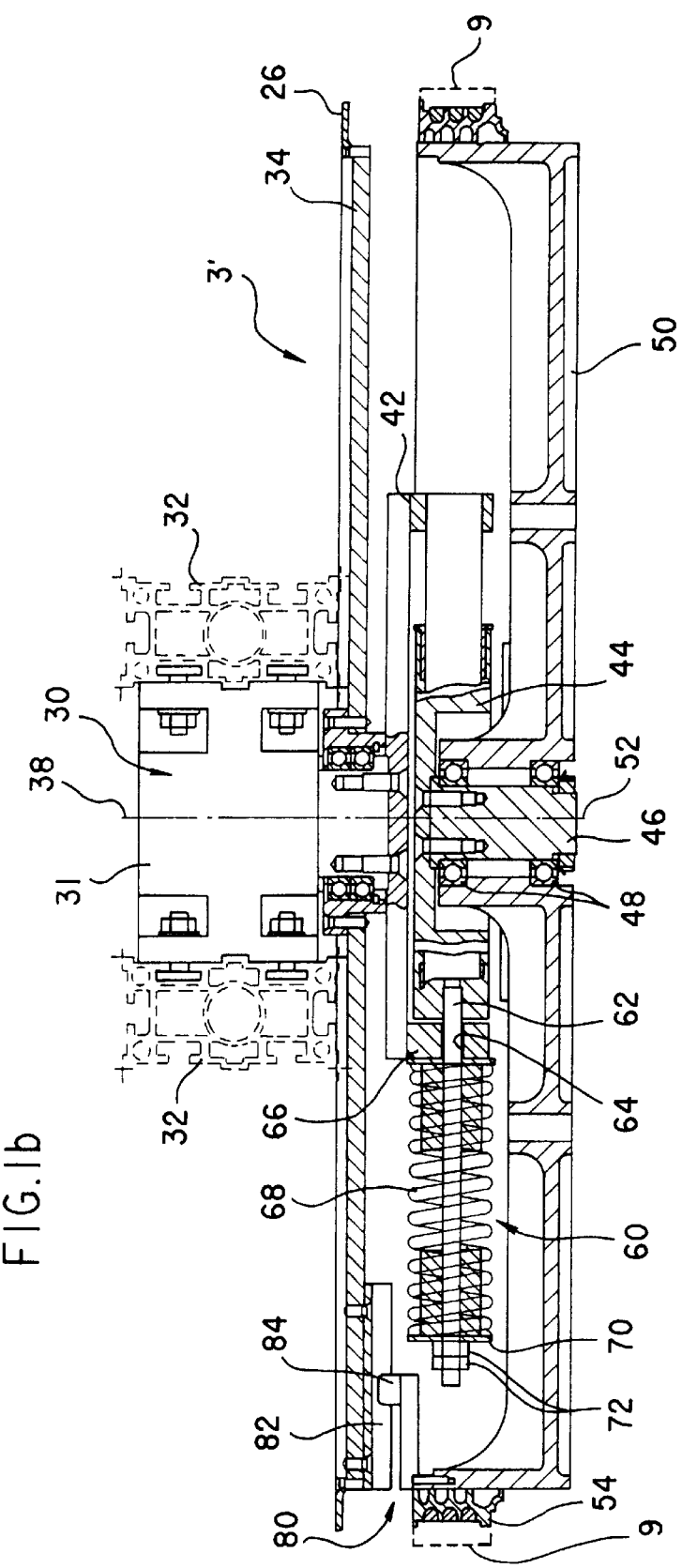
Figure 2:
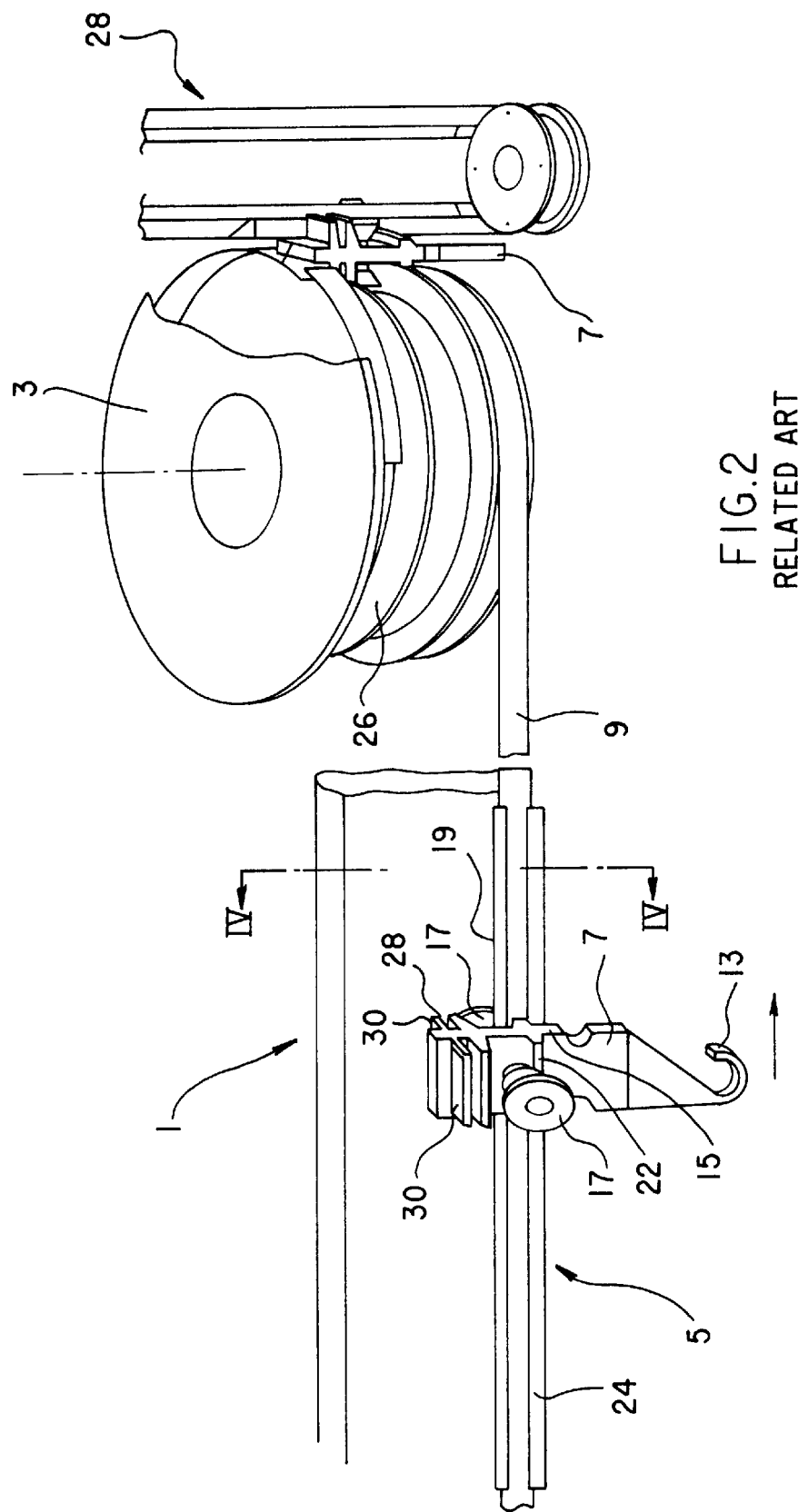
Figure 3:
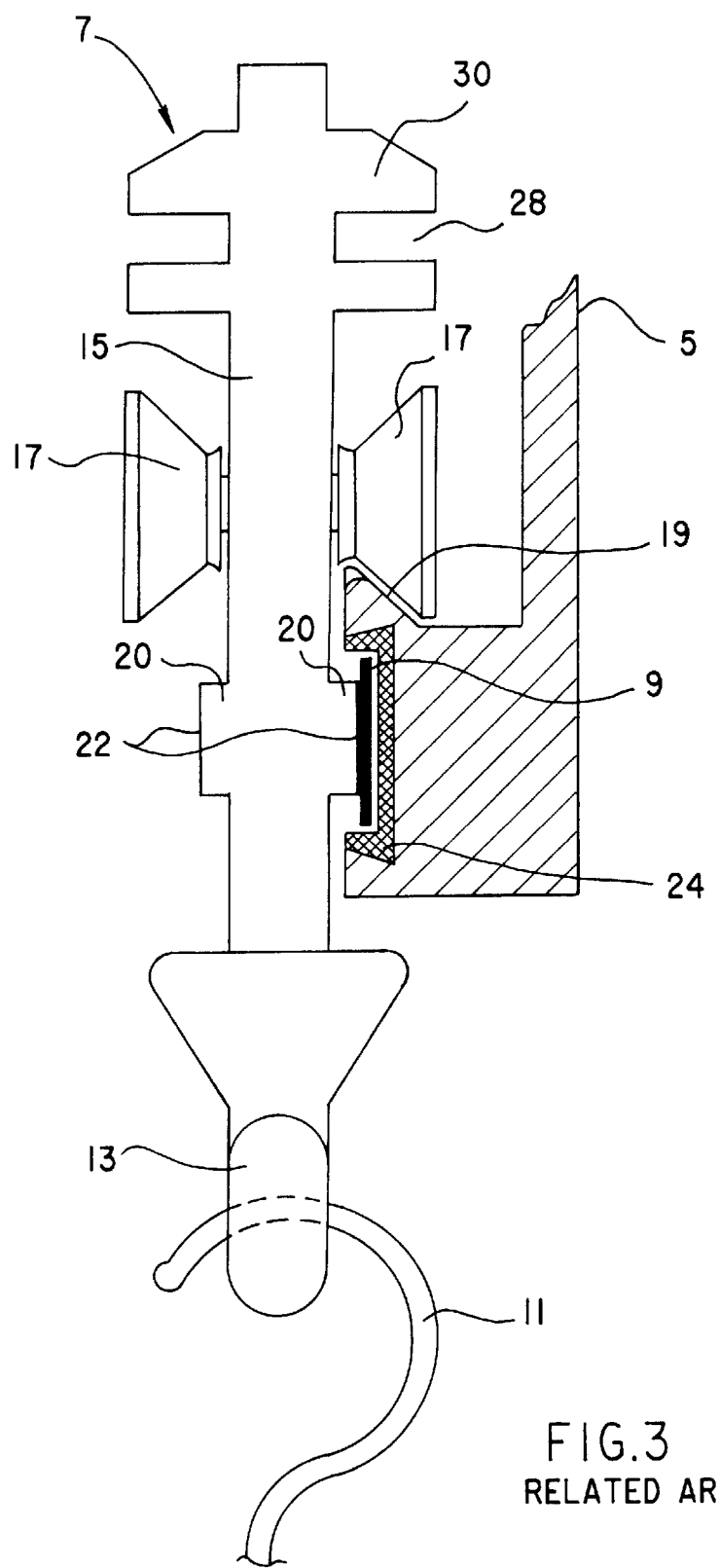

The deflecting arrangement according to the invention can be used as a replacement for a deflecting drum, in particular, in an overhead conveying arrangement of the type known from EP 0 582 047 B1. In the figures:

FIG. 1a shows a partially sectioned illustration of a deflecting arrangement according to the invention, the first deflecting element being in its first position, FIG. 1b shows a corresponding illustration of the deflecting arrangement according to FIG. 1a, the second deflecting element being in its second position, FIG. 2 shows a perspective illustration of part of a prior-art conveying arrangement in which the deflecting arrangement according to FIGS. 1a and 1b can be used instead of a deflecting drum, FIG. 3 shows a conveyable-article carrier on a running rail of the conveying arrangement according to FIG. 2, the running rail being shown only in part and in a sectional illustration along the section plane indicated at IV—IV in FIG. 2.

FIG. 2 illustrates part of an overhead conveying arrangement as is known from EP 0 582 047 B1 and in which the deflecting arrangement 3' according to FIGS. 1a and 1b can be used instead of the deflecting drum 3 shown in FIG. 2.

The conveying arrangement for transporting conveyable-article carriers 7 according to FIG. 2 comprises a first conveying circuit 1 in the form of an elongate conveying loop having two deflecting drums 3 and having running rails 5 along the straight-line route regions between the deflecting drums 3. All that is illustrated of the conveying circuit 1 in FIG. 2 are the right-hand deflecting roller 3, as seen in the viewing direction, and the front running rail 5, as seen in the viewing direction. The conveying circuit 1 has a further deflecting drum, on the side located opposite the deflecting drum on the left, and, to the rear of the running rail 5, a further corresponding running rail.

In the case of the example, the conveyable-article carriers 7 which are to be transported are so-called hanger carriers for transporting articles of clothing hanging on clothes hangers. As is indicated in FIG. 3, the hook 11 of a clothes hanger may be fitted into the bottom hook 13 of the conveyable-article carrier 7. The conveyable-article carrier 7 has an essentially vertically aligned carrier body 15 having two running rollers 17 projecting on the mutually opposite lateral sides of the carrier body 15. During the movement along the running rail 5, the conveyable-article carrier 7 is supported on a running surface 19 of the running rail 5 by way of in each case one running roller 17, with the result that it is suspended laterally on the running rail 5 and is guided in the longitudinal direction of the running rail 5. Beneath the running rollers 17, in each case one lateral protrusion 20 is provided on the carrier body 15 by way of an outer friction surface 22. In FIG. 3, the protrusion 20 located on the right-hand side of the carrier body 15 has its friction surface 22 butting with a friction fit against the friction belt 9, which is guided in the longitudinal direction of the running rail 5 by means of the guide 24, with the result that the friction belt 9 carries along the conveyable-article carrier 7 for movement along the running rail 5.

The running rail 5, which is illustrated in a broken-away state in FIG. 2, has its right-hand end guided up to the vicinity of the deflecting drum 3, with the result that the conveying flange on the deflecting drum 3, said flange being marked 26, can engage in the lateral groove 28 of the conveyable-article carrier 7 which is approaching the deflecting drum 3 in order to receive the conveyable-article carrier 7 from the running rail 5. In this case, the conveyable-article carrier is supported on the top side of the conveying flange 26 by way of the roof web 30 which bounds the groove 28 at the top. The conveyable-article carrier 7 is then deflected in accordance with the rotation of the deflecting drum 3. The stationary arcuate rail (not explained specifically here) engages behind the top end portion of the conveyable-article carrier 7 during the deflecting movement, in order to secure the conveyable-article carrier against slipping off radially from the conveying web 26. According to FIG. 2, a conveyable-article carrier 7 accommodated by the deflecting drum 3 can be optionally transferred, by means of a diverter arrangement (not explained specifically) to a second conveying circuit 28, which may, in principle, be designed in the same way as the first conveying circuit 1.

For disruption-free operation of the conveying arrangement, the essential factor is for the transfer locations for the conveyor-article carrier 7 between the running rail 5 and the deflecting drum 3 and between the deflecting drum 3 and the second conveying circuit 28 to have defined geometrical positions. The deflecting drums 3 and the running rails 5 should thus remain arranged in constant mutual geometrical relationships, and the endless friction belt 9 should be tensioned sufficiently in order to avoid slippage between the friction belt 9 and deflecting drums 3. For driving the friction belt 9, one of the deflecting drums 3 is driven in rotation by a drive arrangement (not shown), with the result that it advances the friction belt 9 with a friction fit during its rotation.

As has already been mentioned, heat-expansion effects and/or wear may result in the tensioning of the friction belt 9 changing, with the result that the friction belt 9 tends to slip. On account of the fixed distance between the deflecting drums 3 enclosed by the friction belt 9, this problem could only be countered to a limited extent in the case of the known conveying arrangement according to FIG. 2.

However, this problem can be overcome if at least one of the deflecting drums 3 is replaced by a deflecting arrangement according to the invention, for example by the deflecting arrangement 3' according to FIGS. 1a and 1b.

The deflecting arrangement 3' according to FIGS. 1a and 1b has a mount 30 which is fastened on carrier-profile rails 32 by way of its top, head part 31. Beneath the head part 31, as first deflecting element, a deflecting wheel 34 for deflecting conveyable-article carriers 7 is mounted on the mount 30, such that it can be rotated about the vertical axis of rotation 38, by means of the rolling-contact bearings 36. The deflecting wheel 34 has a circumferential flange 26 which, in accordance with the function of the conveying flange 26 of the deflecting drum 3 in FIG. 2, is provided for the engagement of conveyable-article carriers 7 and for carrying along the conveyable-article carrier 7 during the rotation of the deflecting wheel 34.

The journal 40 of the mount 30, said journal extending axially through the deflecting wheel 34, has, at its bottom end, a carriage guide 42 in which a carriage 44 is guided such that it can be displaced linearly between the right-hand end position, shown in FIG. 1a and the left-hand end position, shown in FIG. 1b. A bearing journal 46 with rolling-contact bearings 48 for a second deflecting wheel 50 is provided on the underside of the carriage. The second deflecting wheel 50 is mounted such that it can be rotated about the axis of rotation 52, and serves for deflecting an endless friction belt, as designated at 9 in FIG. 2. For guiding the endless friction belt 9, a plastic guide body 54 with a circumferential groove for the friction belt 9 is fastened on the circumference of the second deflecting wheel 50. It would be necessary for the deflecting arrangement 3' with the alignment according to FIGS. 1a and 1b to be installed in the conveying arrangement according to FIG. 2 such that it replaced that deflecting drum which is not shown and is located on the left-hand side opposite the deflecting drum 3 which is shown, with the result that the endless friction belt 9 is tensioned in each case via the left-hand region of the circumference of the deflecting wheel 50 in FIGS. 1a and 1b.

A prestressing arrangement 60 ensures that the deflecting wheel 50 is resiliently prestressed against the friction belt 9 in the direction of the position shown in FIG. 1b. The prestressing arrangement 60 has a pull/push rod 62 which is mounted displaceably in a horizontal bore 64 of the left-hand side wall 66 of the carriage guide 42 and is fastened on the carriage 44 by way of its end which is located on the right-hand side in FIGS. 1a and 1b. A compression spring 68, which has the pull/push rod 62 passing through it axially and, in the case of the example, is designed as a helical spring, is supported, on the one hand, on the vertical side wall 66 of the carriage guide 42 and, on the other hand, on a spring plate 70, which is seated on the left-hand end portion of the push rod 62 and is forced against the adjusting screw 72 by the compression spring 68. The compression spring 68 thus subjects the push rod 62 to a force which is directed to the left in FIGS. 1a and 1b, in order for the carriage 44 and the deflecting wheel 50, which is mounted rotatably thereon, to be forced in the direction of the end position shown in FIG. 1b. In this case, the deflecting wheel 50 is always prestressed against the circulating endless friction belt.

The stressing of the spring 68 may be adjusted as required by axial adjustment of the spring plate 70 by means of the adjusting screw 72.

In the installed state of the deflecting arrangement 3' within the conveying arrangement, the carriage 44 is normally located between the two end positions according to FIGS. 1a and 1b, with the result that, in the case of an extension in length of the endless friction belt 9 it can shift in the direction of the second position, shown in FIG. 1b under the force of the compression spring 68, with the tensioning of the endless friction belt 9 being maintained in the process. If the endless friction belt 9 is shortened, for example in the event of the ambient temperature dropping, then the carriage 44 may yield in the direction of the position shown in FIG. 1a under the force to which the deflecting wheel 50 is subjected by the endless friction belt 9 and which counteracts the force of the compression spring 68. On account of this yielding movement of the carriage 44 and of the deflecting wheel 50, which is mounted rotatably thereon, it is ensured that the endless friction belt 9 remains tensioned in the manner which is optimum for reliable operation of the conveying arrangement. The endless friction belt 9 thus cannot subject the deflecting arrangement 3' to excessive stressing which overloads the rotary bearings and the mount.

In the deflecting arrangement 3' according to FIGS. 1a and 1b the deflecting wheel 50 is driven for rotation with a friction fit by the moving endless friction belt 9 during conveying operation in a conveying arrangement.

A coupling arrangement 80 ensures that the first deflecting wheel 34 rotates synchronously with the second deflecting wheel 50. On the underside of the first deflecting wheel 34, the coupling arrangement 80 has a radial guide slot 82 in which a carry-along element 84, which projects upward on the top side of the second deflecting wheel 50, engages. During joint rotation of the deflecting wheels 34, 50, the carry-along element 84 in the guide slot 82 can execute radial yielding movements relative to the guide slot 82. These yielding movements are produced on account of the normally present eccentricity of the mutually parallel axes of rotation 38 and 52 of the deflecting wheels 34 and 50.

Irrespective of the respective displacement position of the carriage 44 and of the second deflecting wheel 50, which is mounted rotatably thereon, the first deflecting wheel 34 is thus carried along by the carry-along element 84 for joint rotation with the second deflecting wheel 50. Since the first deflecting wheel 34, irrespective of the respective displacement position of the second deflecting wheel 50, remains in its defined installation location within the conveying arrangement, it can receive conveyable-article carriers 7 from relevant running rails at defined receiving locations and discharge said third carriers to relevant running rails at defined transfer locations. The endless friction belt 9 always has optimum tensioning for disruption-free conveying operation of the conveying arrangement.

What is claimed is:

1. A deflecting arrangement usable within a conveying arrangement having an endless drive belt driven in a loop by a first deflecting station around a running rail that transports a plurality of article carriers thereon, the deflecting arrangement located in the loop and operating with the first deflecting station in driving the belt, the deflecting arrangement comprising:

a mount having a vertical axis;

a first deflecting element that deflects the article carriers and is rotatably mounted about the vertical axis of the mount; and a second deflecting element that deflects the belt, wherein the second deflecting element is displaceable relative to the first deflecting element and is movable between a first position of reduced distance from the first deflecting station and a second position of increased distance from the first deflecting station.

2. The deflecting arrangement according to claim 1, wherein the second deflecting element is fixable in either the first or second position.

3. The deflecting arrangement according to claim 1, further comprising a prestressing arrangement which subjects the second deflecting element to a force that resiliently prestresses the second deflecting element in a direction of the second position to tension the belt.

4. The deflecting arrangement according to claim 3, further comprising a carriage that is guided in a carriage guide provided on the mount, wherein the second deflecting element is arranged on the carriage so as to be displaceable relative to the first deflecting element.

5. The deflecting arrangement according to claim 4, wherein the prestressing arrangement comprises a prestressing spring that produces the prestressing force.

6. The deflecting arrangement according to claim 5, wherein the prestressing spring acts between the mount and the carriage to prestress the second deflecting element in a direction of the second position.

7. The deflecting arrangement according to claim 1, wherein the first deflecting element and the second deflecting element are deflecting wheels with mutually parallel axes of rotation.

8. The deflecting arrangement according to claim 1, further comprising a guide body disposed on an outer circumferential surface of the second deflecting element, the guide body having a circumferential groove for engaging the belt.

9. The deflecting arrangement according to claim 1, wherein the belt is a friction belt for carrying along the conveyable-article carriers by a friction fit.

10. The deflecting arrangement according to claim 1, wherein the belt is a conveying chain with which the conveyable-article carriers can be brought into drive connection.

11. The deflecting arrangement according to claim 1, further comprising a coupling arrangement which couples the first and second deflecting elements together for joint rotation.

12. The deflecting arrangement according to claim 11, wherein the coupling arrangement includes a radial guide on one of the first and second deflecting elements and a coupling element on the other of the first and second deflecting elements, the coupling element engages the radial guide in a displaceable manner relative to the radial guide.

\* \* \* \* \*